(12) United States Patent
Behrendt et al.

(10) Patent No.: US 8,200,749 B2
(45) Date of Patent: Jun. 12, 2012

(54) DATA PROCESSING METHOD FOR GENERATING SERVICE INTERFACE DESCRIPTIONS

(75) Inventors: Michael Behrendt, Randersacker (DE); Gerd Breiter, Wildberg (DE); Harald Daur, Esslingen (DE); Georg Ochs, Moetzingen (DE)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 12/033,069

(22) Filed: Feb. 19, 2008

(65) Prior Publication Data

US 2008/0215673 A1 Sep. 4, 2008

(30) Foreign Application Priority Data

Mar. 1, 2007 (EP) .................... 07103336

(51) Int. Cl.
*G06F 15/16* (2006.01)
*G06F 15/173* (2006.01)
*H04L 12/66* (2006.01)
*H04L 12/56* (2006.01)

(52) U.S. Cl. ........ 709/203; 709/226; 709/328; 370/352; 370/401

(58) Field of Classification Search ........... 709/201–203
See application file for complete search history.

(56) References Cited

U.S. PATENT DOCUMENTS

| 2003/0204645 | A1* | 10/2003 | Sharma et al. | 709/328 |
| 2006/0140171 | A1* | 6/2006 | Croak et al. | 370/352 |
| 2007/0121593 | A1* | 5/2007 | Vance et al. | 370/352 |
| 2007/0288636 | A1* | 12/2007 | Rogers et al. | 709/226 |

* cited by examiner

*Primary Examiner* — Ashok Patel
*Assistant Examiner* — Evans Desrosiers
(74) *Attorney, Agent, or Firm* — Cantor Colburn LLP; William A. Kinnaman, Jr.

(57) ABSTRACT

A data processing method is disclosed. The data processing method comprises the step of receiving a request for a service interface description of a service from a client at a server, wherein the service is implemented via a first service endpoint at the server, and wherein the first service endpoint is associated with a first service endpoint interface description. In a further step, a given set of correlations is employed for the determination of service endpoints correlated with the first service endpoint with respect to the service, wherein each of the correlated service endpoints is associated with a service endpoint interface description. Furthermore the service interface description is generated by aggregating the first service endpoint interface description with the service endpoint interface descriptions of the correlated service endpoints and the service interface description is provided to the client.

17 Claims, 4 Drawing Sheets

DATA PROCESSING METHOD FOR GENERATING SERVICE INTERFACE DESCRIPTIONS

CROSS-REFERENCE TO RELATED APPLICATION

This application claims the priority benefit under 35 U.S.C. §119 of prior European application 07103336.9, filed Mar. 1, 2007, and incorporated herein by reference.

BACKGROUND OF THE INVENTION

1. Field of the invention

The invention relates to a data processing method for generating service interface descriptions in general and for dynamically generating service interface descriptions in particular. The invention also relates to a computer program product adapted to perform the data processing method and to a data processing system for providing a combined service interface description for multiple deployed services.

2. Description of the Related Art

Web services are commonly employed to provide services to so called clients over, e.g., the public internet. The W3C defines a web service as a software system designed to support interoperable machine-to-machine interaction over a network such as the internet. Web services are frequently just application programming interfaces (API) that can be accessed over a network, and executed on a remote system hosting the requested services.

The W3C web service definition encompasses many different systems, however, according to common usage, the term refers to those services that use SOAP-formatted XML envelopes and have their interfaces described by WSDL. The acronym SOAP refers thereby to the simple objects access protocol which is an XML-based, extensible message envelope format, with bindings to underlying protocols such as HTTP, SMTP, and XMPP. XML is an acronym for extensible markup language. XML is a standard, which defines how markup-based languages are structured.

The web services description language, for which the acronym WSDL is used, is an XML-based language that provides a model for describing web service interfaces. In particular, WSDL is an XML-based service description on how to communicate using web services.

A web service is usually deployed to a web service runtime and thereby exposed to a client by one or more web service endpoints. Each web service endpoint is further associated with a service endpoint interface description which is usually implemented by use of WSDL. The service endpoint interface description provides specifications for the client with respect to the functions, data, data types, port types, messages, and so on, that are employed by the corresponding service endpoint or that can be provided by the service endpoint. The service endpoint interface description is a WSDL-based description of the defined service endpoint which can be exported such that a remote client may use the information contained in the WSDL description to locate and to remotely invoke features of the corresponding service endpoint.

A client must according to prior art request each service endpoint interface description of each service endpoint separately in order to get a holistic view of all features provided by the underlying services.

SUMMARY OF THE INVENTION

It is an object of the invention to provide a method for generating an aggregated service interface description of the service for a client so that the client must not request for service endpoint interface descriptions of several service endpoints with different features and/or functionalities that are associated with the aggregated service.

According to a first aspect of the invention, there is provided a data processing method. In accordance with an embodiment of the invention, the method comprises the step of receiving a request for a service interface description of a service from a client at a server. The service is implemented via a first service endpoint at the server, and the first service endpoint is associated with a first service endpoint interface description. In a further step, a given set of correlations is employed for the determination of service endpoints correlated with the first service endpoint with respect to the service, wherein each of the correlated service endpoints are associated with a service endpoint interface description. In a subsequent step, the service interface description is generated by aggregating the first service endpoint interface description with the service endpoint interface descriptions of the correlated service endpoints. The service interface description is then provided by the server to the client.

From a server's point of view, a service implemented by the first service endpoint as well as the services implemented via the correlated service endpoints can be seen as sub-services, whereas each service is seen from the client's point of view as an (independent) service. The service description interface thus provides from the server's view point a holistic view over all the correlated sub-services and announces the functionality of all the 'sub-services' that are made available to the client and that are regarded by the client otherwise as independent services.

According to the embodiment of the invention, the server or an entity of the server determines the service endpoints that are associated with the first service endpoint through which the service is implemented in response to a request of the client for the service interface description of the service. The service endpoints associated with the first service endpoint provide different features and/or functionalities with respect to the service. For example the service could relate to a calculator. The first service endpoint might then relate to the "plus"-operation, whereas an associated service endpoint might relate to the "minus"-operation.

The service interface description is aggregated by use of the first service endpoint description and the service endpoint interface descriptions of the correlated service endpoints. The service interface description can for example be generated by integrating the first service endpoint interface description and the service endpoint interface descriptions of the correlated service endpoints into the service interface description which is made available to the client. The client is thus able to retrieve the service interface description and to use the information contained in the service interface description to locate and remotely invoke the service. According to the example given above, the client further obtains a holistic view of the "aggregated" service as the client receives via the service interface description detailed information about the "plus"-operation as well as about the "minus"-operation.

The method in accordance with the invention is therefore particularly advantageous as the service interface description is generated such that it comprises the first service endpoint interface description and the service endpoint interface descriptions of the correlated service endpoints. The client therefore obtains a holistic view of the service provided by the server and does not need to request an interface description of each service endpoint separately.

The use of a service interface description which comprises the first service endpoint interface description and the service endpoint interface descriptions of the correlated service endpoints is further particularly advantageous as the service interface description provides a single point of entry for the client in order to access the corresponding aggregated service.

In accordance with an embodiment of the invention, the first service endpoint interface description depends on a status of the first service endpoint. The service interface description is then (re-)generated in response to a change of the status of the first service endpoint. The first service endpoint interface description might provide different specifications or information about the corresponding first service endpoint for the client depending on the status of the first service endpoint. The status of an endpoint might change frequently. As the service interface description is generated in response to a change of the status of the first service endpoint, it reflects the status change and it is therefore ensured that the client obtains up to date information about the service.

In accordance with an embodiment of the invention, a service endpoint interface description of a correlated service endpoint depends on the status of the correlated service endpoint. The service interface description is generated in response to a change of the status of the correlated service endpoint. A correlated service endpoint might change its status and, as has been the case for the first service endpoint interface description as described above, the corresponding service endpoint interface description of the correlated service endpoint can reflect the status change. As the service interface description is generated in response to such a change, up to date information about the service is provided to the client.

In accordance with an embodiment of the invention, the set of correlations provides specifications of how the first service endpoint is correlated with the correlated service endpoint with respect to the state of the first service endpoint and/or with respect to the states of the one or more correlated service endpoints. The set of correlations provides therefore instructions on which service endpoint interface description shall be taken into account for the generating of the service interface description depending on the states of the first service endpoint and/or the correlated service endpoints.

In accordance with an embodiment of the invention, the service implemented via the first service endpoint comprises features of at least one base service, wherein the set of correlations relates to the base service, wherein the service endpoint interface description of the base service is determined via the set of correlations, and wherein the service endpoint interface description of the base service is aggregated in the service interface description. The service implemented via the first service endpoint might provide features inherited from the base service. The base service can therefore be seen as the service from which the service has inherited some features. The set of correlations refer to the base service and therefore allow to identify the base service and to select the service endpoint interface description of the base service so that it can be integrated into the service interface description.

In accordance with an embodiment of the invention, the set of correlations relates to the functionality of the client. The service endpoint interface descriptions aggregated in the service interface description might then relate to the functionality or to the role of the client with respect to the service (the client can for example relate to an administrator or to a user of the service). In that sense, a client specific service interface description is provided to each client that requests for it. This provides the advantage that service interface descriptions of services can be designed by taking into account the role of the client.

In accordance with an embodiment of the invention, a second service endpoint is correlated with the first service endpoint with respect to the service, wherein the set of correlations is adapted to reflect the correlation between the first and second service endpoints, wherein the second service endpoint is associated with a second service endpoint interface description, and wherein the service interface description reflecting the first and second service endpoint interface description is generated in response to the deployment of the second service endpoint. Hence, once a second service endpoint which is correlated with the first service endpoint is deployed, the service interface description is regenerated such that it comprises the first and second service endpoint interface descriptions. The service interface description is therefore dynamically modified depending on the service endpoints deployed at the server which are correlated with the first service endpoint.

In accordance with an embodiment of the invention, the service interface description is regenerated in response to an undeployment of the second service endpoint without taking into account the second service endpoint interface description which is also undeployed along with the second service endpoint. The service interface description is therefore generated dynamically in order to reflect any deployment or undeployment of a service endpoint associated with the corresponding service.

In accordance with an embodiment of the invention, the first service endpoint, the correlated service endpoints, the first service endpoint interface description, the service endpoint interface descriptions of the correlated service endpoints, the second service endpoint, the second service endpoint interface description, and the service interface description are deployed at a service container which is implemented by the server. The service container is a software component executed by the server or by an operating system running on the server which allows deploying the service endpoints and the associated service endpoint interface descriptions for the client. A container can be seen as a component mediating between the client and the components that actually provide the service. The container can therefore also be seen as middleware linking the client with the service.

In accordance with an embodiment of the invention, the first service endpoint, the correlated service endpoints, the first service endpoint interface description, and the service endpoint interface description of the correlated service endpoints are deployed at the service container, wherein the first service endpoint, the correlated service endpoint, the first service endpoint interface description, and the service endpoint interface descriptions of the correlated service endpoints are provided to the service container via an administrative interface. The service container has at least one administrative interface which is used by the service provider in order to deploy the service endpoints and associated service endpoint interface descriptions on the service container.

In accordance with an embodiment of the invention, the set of correlations is provided to the service container via the administrative interface. The administrative interface further allows deploying the set of correlations on the service container so that the set of correlations can be employed to dynamically generate the service interface description from the deployed service endpoint interface descriptions of correlated service endpoints as described above.

In accordance with an embodiment of the invention, a service endpoint interface description provides a description and specifications with respect to the associated service endpoint. The service endpoint interface description is for example a WSDL file, whereas the associated service endpoint relates to a Java file.

According to a second aspect of the invention, there is provided a computer program product comprising a computer-readable medium (in particular, a tangible medium such as semiconductor memory, magnetic tape, or a magnetic or optical disk) storing computer executable-instructions which are adapted to perform the method in accordance with the invention.

According to a third aspect of the invention, there is provided a data processing system. According to an embodiment of the invention, the data processing system has means for receiving a request for a service interface description for a service from a client at a server, wherein the service is implemented via a first service endpoint at the server, and wherein the first service endpoint is associated with a first service endpoint interface description. The data processing system further comprises means for employing a given set of correlations for the determination of service endpoints correlated with the first service endpoint with respect to the service, wherein each of the correlated service endpoints is associated with a service endpoint interface description. The data processing system has means for generating the service interface description by aggregating the first service endpoint interface description with the service endpoint interface descriptions of the correlated service endpoints and means for providing the service interface description to the client.

BRIEF DESCRIPTION OF THE DRAWINGS

In the following embodiments of the invention will be described in greater detail by making reference to the drawings in which.

DETAILED DESCRIPTION

Figure 1:
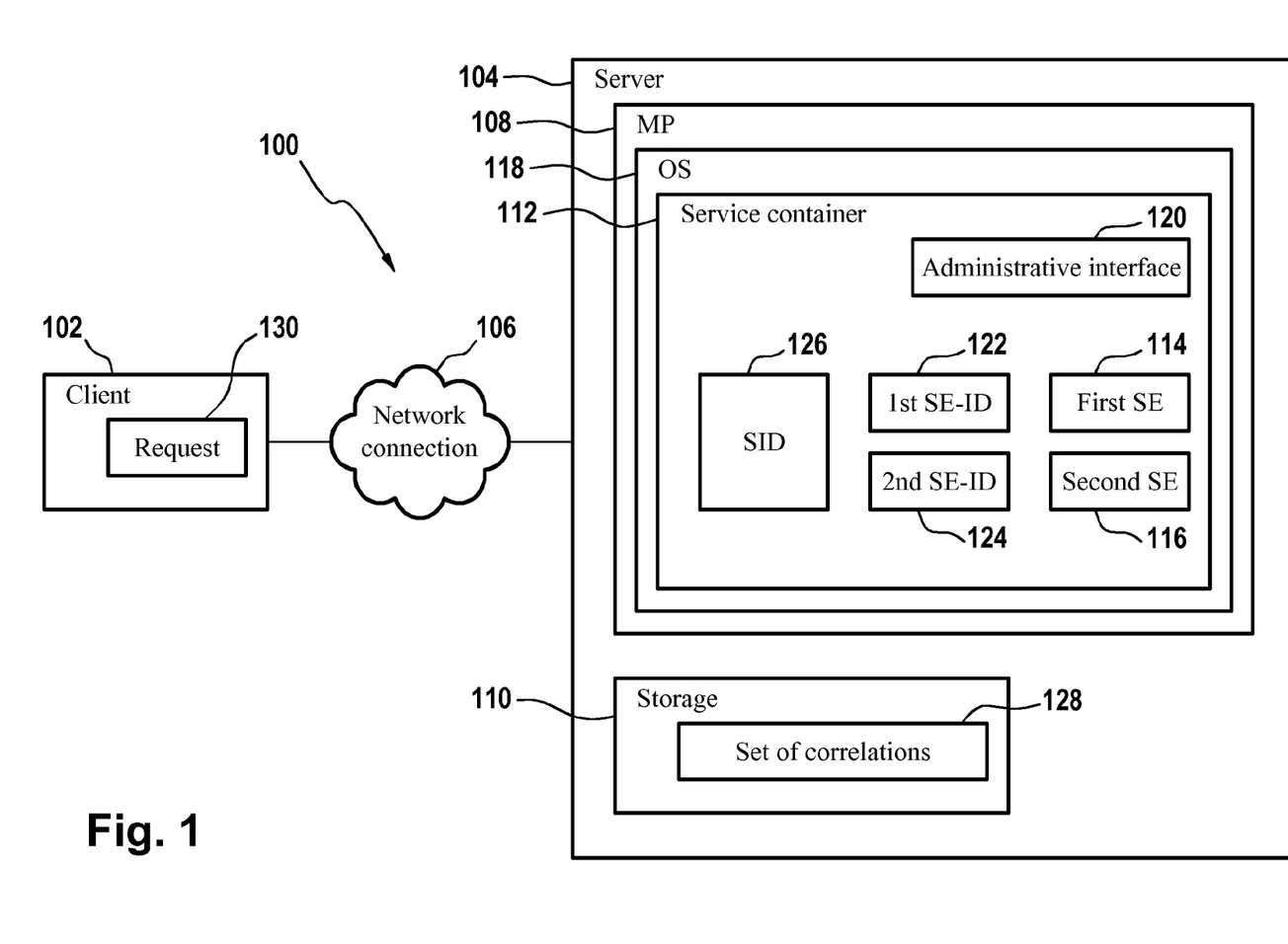
FIG. 1 shows a schematic block diagram of a client-server system.

FIG. 1 shows a schematic block diagram of a client-server system 100. The client-server system 100 comprises a client 102 and a server 104. The client 102 and the server 104 are connected over a network connection 106. The client 102 can be regarded as a computer system that is able to communicate with the server 104 via the network connection 106 which is for example a wireless local area network (WLAN) connection. The server 104 can also be regarded as a computer system and comprises a microprocessor (MP) 108 and storage 110.

The microprocessor 108 executes an operating system (OS) 118. The operating system 118 hosts a service container 112 which can be seen as a runtime environment for a service or for a set of services that are provided by the server 104 to the client 102. The service container 112 has an administrative interface 120. A service is provided to the client 102 through at least a first service endpoint (SE) 114 which is deployed along with an associated service endpoint interface description (SE-ID) 122 via the administrative interface 120 on the service container 112. Furthermore a second service endpoint 116 along with an associated second service endpoint interface description 124 is deployed via the administrative interface 120. The second service endpoint 116 shall be associated with the first service endpoint 114 with respect to the service.

The first service endpoint interface description 122 provides a description of the first service endpoint 114, e.g., for the client 102. The second service endpoint interface description 124 further provides a description of the second service endpoint 116, e.g., for the client 102. The first and second service endpoint interface descriptions 122, 124 can for example be implemented as WSDL files. WSDL is a XML-based language that provides a model for describing services. A service endpoint interface description provides detailed information for a client. The information specifies how the client must communicate with the service and which functionality is provided by the service.

A set of correlations 128 is deployed on the service container 112 via the administrative interface 120. The set of correlations 128 provides information about the service endpoints that are related with other service endpoints with respect to a particular service. The set of correlations 128 is stored on the storage 110. The set of correlations might have been provided and might be maintained by an administrator of the server 104.

In order to use the service associated with the first service endpoint 114, the client 102 sends a request 130 to the server 104, where it is received and processed. The service container 112 is able to determine by use of the set of correlations 128 that the second service endpoint 116 is associated with the first service endpoint 114 with respect to the service.

A service interface description (SID) 126 is then generated by aggregating the first service endpoint interface description 122 and the second service endpoint interface description 124. According to an embodiment of the invention, the term aggregating may be understood as integrating both the first and second service endpoint interface descriptions 122, 124 into the service interface description 126.

The service interface description 126, which provides a holistic view of the service as the service endpoint interface descriptions of all associated service endpoints are comprised in the service interface description 126, is then provided by the service container 112 to the client 102. The service interface description 126 can be implemented as a WSDL file which can be transmitted via the connection 106 to the client 102 in response to the request 130.

Figure 2:
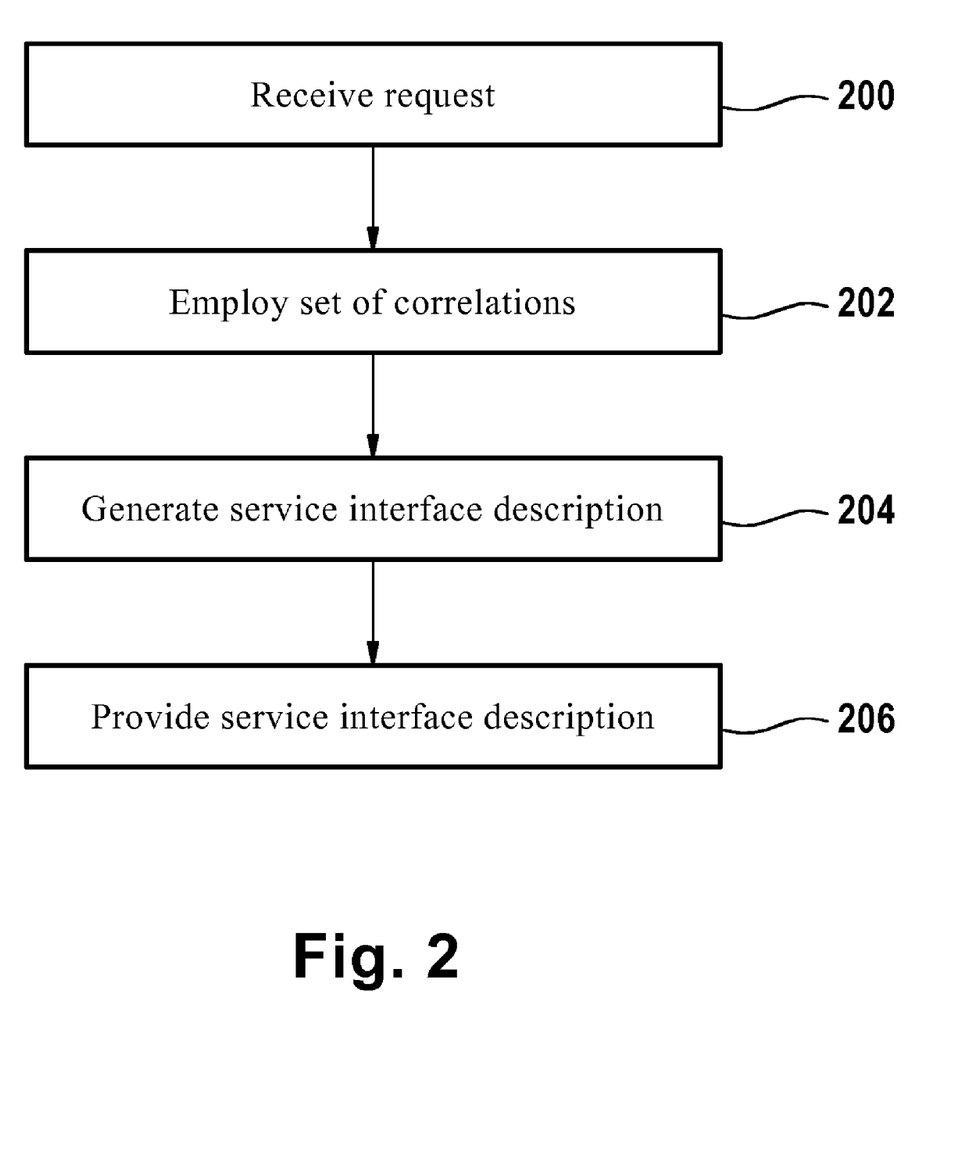
FIG. 2 shows a flow diagram illustrating steps of an embodiment of the method in accordance with the invention.

FIG. 2 shows a flow diagram which illustrates steps according to a data processing method in accordance with the invention. In step 200 a request for a service interface description of a service is received from a client at a server, wherein the service is implemented via a first service endpoint at the server, and wherein the first service endpoint is associated with a first service endpoint interface description. In step 202, a given set of correlations is employed for the determination of service endpoints correlated with the first service endpoint with respect to the service, wherein each of the correlated service endpoints is associated with a service endpoint interface description. In step 204, the service interface description is generated by aggregating the first service endpoint interface description with the service endpoint interface descriptions of the correlated service endpoints. In step 206, the service interface description is provided by the server to the client.

Figure 3:
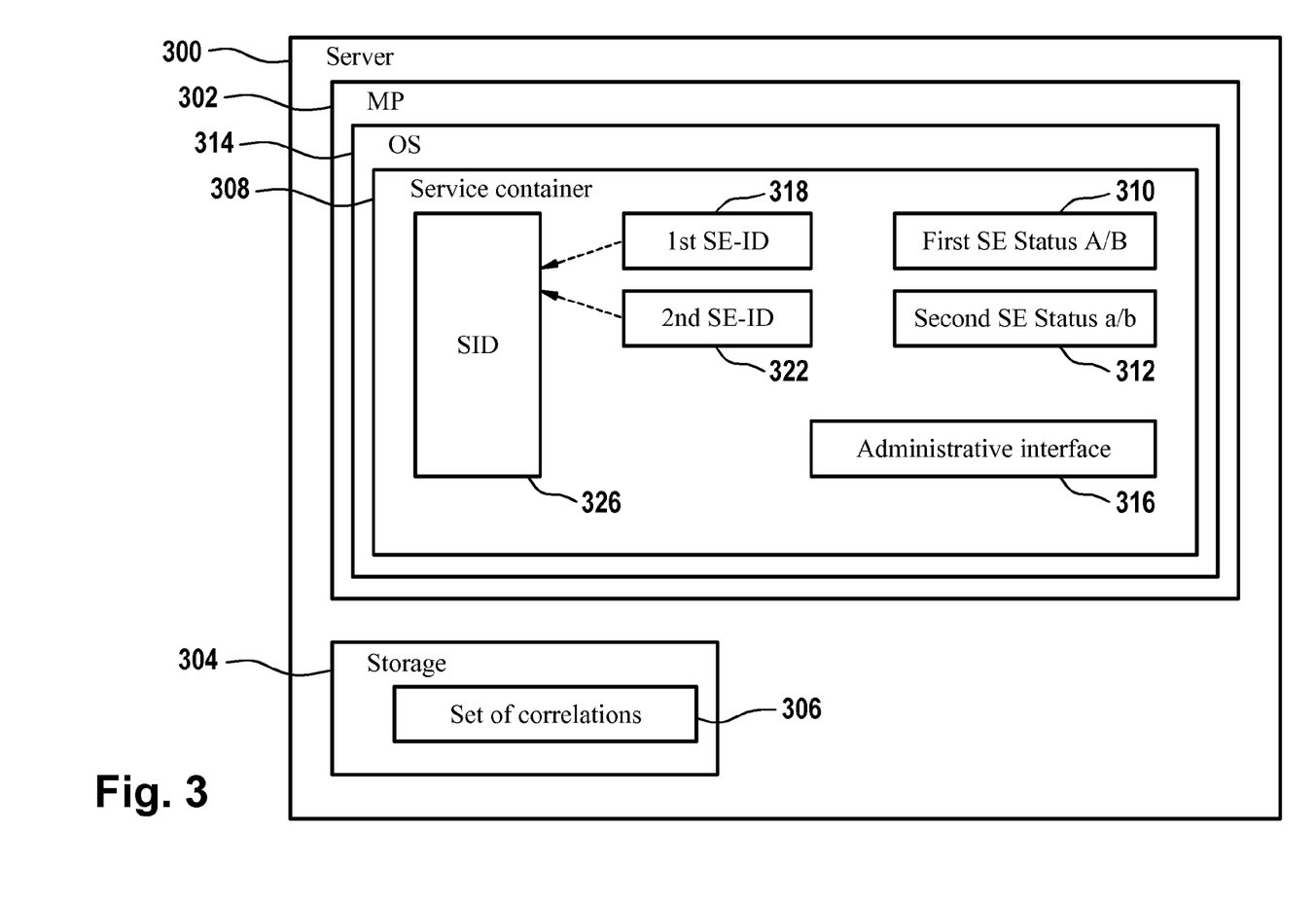
FIG. 3 shows a schematic block diagram of a server deploying a service on a service container.

FIG. 3 shows a schematic block diagram of a server 300. The server 300 comprises a microprocessor 302 and storage 304. The microprocessor 302 executes an operating system 314 which hosts a service container 308 through which at least a service is provided to a client (the client is not shown in FIG. 3). The service might be provided to the client via a first service endpoint 310 which is deployed via an administrative interface 316 on the service container 308. The service employed via the first service endpoint 310 can relate to several states which are also denoted as service instances. These states or instances are instantiated during runtime with respect to the service.

The first service endpoint 310 might for example relate to a state A and/or to a state B reflecting a service instance A and/or a service instance B. A first service endpoint interface description 318 is further deployed on the service container 308 which might reflect the state of the first service endpoint 310.

A second service endpoint 312 which is associated with the first service endpoint 310 is also deployed via the administrative interface 316 on the service container 308. Several states or instances of the second service endpoint 312 might be instantiated, e.g., state a and state b. A second service endpoint interface description 322 reflecting the state of the second service endpoint 312 is further deployed on the service container providing a description of the second service endpoint when relating to state a and/or to state b.

A set of correlations 306 which comprises information about the relationships that exist between the various service endpoints with respect to the various states or service instances is further deployed by the service container 308 via the administrative interface 316. The set of correlations 306 is stored on the storage 304. The set of correlations 306 might for example provide the information that when the first service endpoint 310 relates to state A, then only the second service endpoint 312 relating to state b is of relevance. Thus, when the client requests for a service description interface for the service instance A, a service interface description is generated which comprises the first service endpoint interface description 318 for state A and the second service endpoint interface description 322 for state b. The generated service interface description 326 is then provided to the requesting client on the service container 308.

The status or instance of a service might also change. For example, the first service endpoint 310 might at first relate to the state A of the service. The state changes then from state A to state B. In response to a change of a state of a service, the service interface description 326 is generated by the service container 308 by use of the set of correlations 306. The set of correlations 306 might for example specify that the second service endpoint 312 relating to state A is only of relevance, when the first service endpoint 310 relates to state B. Hence, the newly generated service interface description 326 comprises then the first service endpoint interface description 318 relating to state B and the second service endpoint interface description 322 relating to state a, which will then be made available to the client.

Figure 4:
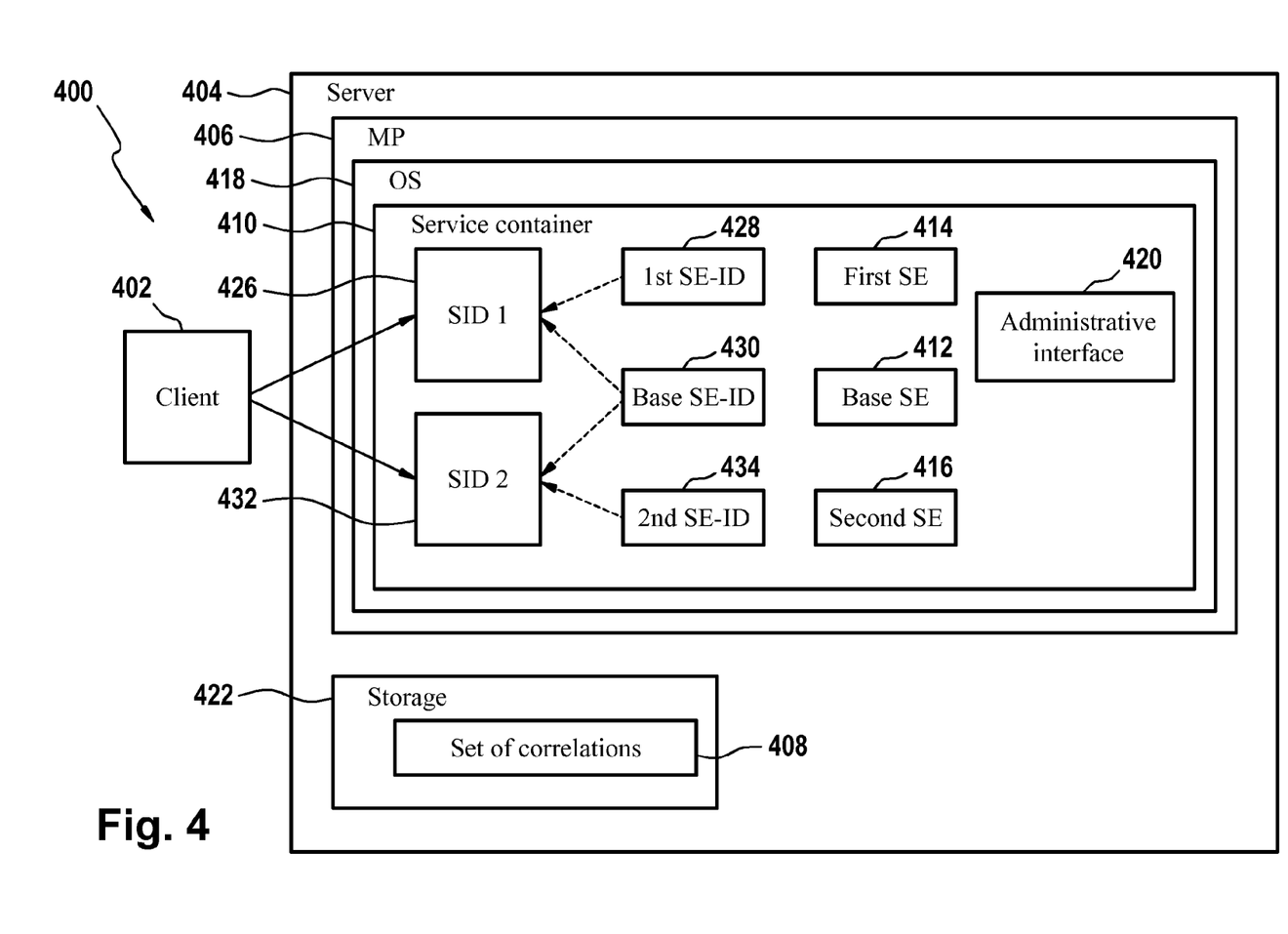
FIG. 4 shows a schematic block diagram of a client-server system.

FIG. 4 shows schematically a block diagram of a client-server system 400. The client-server system 400 comprises a client 402 and a server 404. The client 402 can connect to the server 404 via a network, e.g., via the internet. The server 404 has a microprocessor 406 and storage 408. The microprocessor 406 executes an operating system 418 which hosts a service container 410 in order to provide services to the client 402. A base service might be implemented by the service container 410 by use of a base service endpoint 412 which is deployed via an administrative interface 420 on the service container 410. A first service might be implemented by the server 402 by deploying a first service endpoint 414 and a second service might be implemented by deploying a second service endpoint 416 via the administrative 420 on the service container.

The first service deployed via the first service endpoint 414 might be associated with the base service 412 as the first service might have inherited features from the base service. The second service deployed via the second service endpoint 416 might also comprise inherited features from the base service.

The storage 408 holds a set of correlations 422 which comprises information about the features of the first/second service endpoints that are inherited from the base service which corresponds to the object inheritance model. The set of correlations 422 is also deployed on the service container 410 via the administrative interface 420.

When the server 404 receives a request from the client 402 through which the client 402 requests a service description interface of the first service, the service container 410 is able to identify via the set of correlations 422 that the first service has inherited features from the base service. A first service interface description 426 is then generated by aggregating a first service endpoint interface description 428 and a base service endpoint interface description 430. The service endpoint interface description 428 thereby relates to the first service endpoint 414 and the base service endpoint interface description 430 relates to the base service endpoint 412. The first service interface description 426 is then provided to the client. The first service interface description can for example be implemented in form of a WSDL file which is sent over the network from the server 404 to the client 402.

When the client 402 sends a request for a service interface description of the second service, the service container 410 identifies via the set of correlations 422 that the second service has inherited features from the base service and will then generate a second service interface description 432 by aggregating the base service endpoint interface description 430 and the second service endpoint interface description 434. The second service interface description 432 is then provided to the client 402. The second service interface description 432 can for example be implemented in form of a WSDL file which is sent over the network from the server 404 to the client 402.

APPENDIX

LIST OF REFERENCE NUMERALS

100 Client-server system
102 Client
104 Server
106 Network connection
108 Microprocessor
110 Storage
112 Service Container
114 First service endpoint
116 Second service endpoint
118 Operating system
120 Administrative interface
122 First service endpoint interface description
124 Second service endpoint interface description
126 Service interface description
128 Set of correlations
130 Request
300 Server
302 Microprocessor
304 Storage
306 Set of correlations
308 Service container
310 First service endpoint
312 Second service endpoint 314 Operating system
316 Administrative interface
318 First service endpoint interface description
322 Second service endpoint interface description
326 Service interface description
400 Client-server system
402 Client
404 Server
406 Microprocessor
408 Storage
410 Service container
412 Base service endpoint
414 First service endpoint
416 Second service endpoint
418 Operating system
420 Administrative interface
422 Set of correlations
426 First service interface description
428 First service endpoint interface description
430 Base service endpoint interface description
432 Second service interface description
434 Second service endpoint interface description

What is claimed is:

1. A data processing method comprising: receiving a request for a service interface description of a service from a client at a server, the service being implemented via a first service endpoint at the server, the first service endpoint being associated with a first service endpoint interface description, and a base service, wherein the first service includes features inherited from the base service, the base service having a base service endpoint being associated with a base service endpoint interface description; employing a given set of correlations for determination of service endpoints correlated with the first service endpoint with respect to a state of the service, each of the correlated service endpoints being associated with a service endpoint interface description, wherein the set of correlations includes information about relationships that exist among the correlated service endpoints, and relationships that exist among a plurality of instantiations of a plurality of states for each of the correlated service endpoints, and specifications of how the first service endpoint is correlated with the correlated service endpoint with respect to at least one of the state of the first service endpoint and the states of the one or more correlated service endpoints, providing instructions on which service endpoint interface description is for generating of the service interface description depending on the states of at least one of the first service endpoint and the correlated service endpoints, wherein the set of correlations identify the features that the first service inherited from the base service, wherein the set of correlations include information about features about the first service endpoint inherited from the base service, which corresponds to an object inheritance model; generating the service interface description by aggregating the first service endpoint interface description and the base service endpoint interface description with the service endpoint interface descriptions of the correlated service endpoints; and providing the generated service interface description by the server to the client, wherein a second service endpoint related to a second service having features inherited from the base service, is correlated with the first service endpoint with respect to the service, wherein the set of correlations is adapted to reflect a correlation between the first and second service endpoints, wherein the second service endpoint is associated with a second service endpoint interface description, and wherein a service interface description reflecting the first and second service endpoint interface descriptions is generated in response to deployment or undeployment of the second service endpoint, and wherein the set of correlations identify the features that the second service inherited from the base service.

2. The method according to claim 1, wherein a service endpoint interface description depends on a status of the service endpoint associated with the service endpoint interface description, and wherein the service interface description is generated in response to a change of the status of the associated service endpoint.

3. The method according to claim 1, wherein the set of correlations provides specifications of how the first service endpoint is correlated with a correlated service endpoint with respect to the state of the first service endpoint or the correlated service endpoint.

4. The method according to claim 1, wherein the service implemented via the first service endpoint comprises features of at least one base service, wherein the set of correlations relates to the base service, wherein a service endpoint interface description of the base service is determined via the set of correlations, and wherein the service endpoint interface description of the base service is aggregated in the service interface description.

5. The method according to claim 1, wherein the set of correlations relates to a role of the client.

6. The method according to claim 1, wherein the first service endpoint, the correlated service endpoints, the first service endpoint interface description, the service endpoint interface descriptions of the correlated service endpoints, the second service endpoint, and the second service endpoint interface description are deployed at a service container, and wherein the service container is implemented by the server.

7. The method according to claim 6, wherein the first service endpoint, the correlated service endpoints, the first service endpoint interface description, and the service endpoint interface descriptions of the correlated service endpoints are provided via the service container implemented by the server, and wherein the first service endpoint, the correlated service endpoints, the first service endpoint interface description, and the service endpoint interface descriptions of the correlated service endpoints are deployed to the service container via an administrative interface.

8. The method of claim 7, wherein the set of correlations is provided to the service container via the administrative interface.

9. A computer program product comprising a computer-readable medium storing computer-executable instructions, the instructions being adapted to perform the method according to claim 1.

10. A data processing system comprising: means for receiving a request for a service interface description of a service from a client, the data processing system comprising a server, the service being implementable via a first service endpoint at the server, the first service endpoint being associated with a first service endpoint interface description and a base service, wherein the first service includes features inherited from the base service, the base service having a base service endpoint being associated with a base service endpoint interface description; means for employing a given set of correlations for determination of service endpoints correlated with the first service endpoint with respect to a state of the service, each of the correlated service endpoints being associated with a service endpoint interface description, wherein the set of correlations includes information about relationships that exist among the correlated service endpoints, and relationships that exist among a plurality of instantiations of a plurality of states for each of the correlated service endpoints, and specifications of how the first service endpoint is correlated with the correlated service endpoint with respect to at least one of the state of the first service endpoint and the states of the one or more correlated service endpoints, providing instructions on which service endpoint interface description is for generating of the service interface description depending on the states of at least one of the first service endpoint and the correlated service endpoints, wherein the set of correlations identify the features that the first service inherited from the base service, wherein the set of correlations include information about features about the first service endpoint inherited from the base service, which corresponds to an object inheritance model; means for generating the service interface description by aggregating the first service endpoint interface description and the base service endpoint interface description with the service endpoint interface descriptions of the correlated service endpoints; and means for providing the service interface description to the client, wherein a second service endpoint related to a second service having features inherited from the base service, is deployable, wherein the second service endpoint is correlated with the first service endpoint with respect to the service, wherein the set of correlations is adapted to reflect a correlation between the first and second service endpoints, wherein the second service endpoint is associated with a second service endpoint interface description, and wherein a service interface description reflecting the first and second service endpoint interface descriptions is generated in response to deployment or undeployment of the second service endpoint, and wherein the set of correlations identify the features that the second service inherited from the base service.

11. The system according to claim 10, wherein a service endpoint interface description depends on a status of the service endpoint associated with the service endpoint interface description, and wherein the service interface description is generatable in response to a change of the status of the associated service endpoint.

12. The system according to claim 11, wherein the set of correlations provides specifications of how the first service endpoint is correlated with a correlated service endpoint with respect to the state of the first service endpoint or the correlated service endpoint.

13. The system according to claim 10, wherein the service implementable via the first service endpoint comprises features of at least one base service, wherein the set of correlations relates to the base service, wherein a service endpoint interface description of the base service is determinable via the set of correlations, and wherein the service endpoint interface description of the base service is aggregated in the service interface description of the service.

14. The system according to claim 10, wherein the set of correlations is adapted to reflect a role of the client.

15. The system according to claim 10, wherein the first service endpoint, the correlated service endpoints, the first service endpoint interface description, the service endpoint interface descriptions of the correlated service endpoints, the second service endpoint, and the second service endpoint interface description are deployable at a service container, wherein the service container is implementable by the server.

16. The system according to claim 15, wherein the service container comprises an administrative interface, wherein the first service endpoint, the correlated service endpoints, the first service endpoint interface description, the service endpoint interface descriptions of the correlated service endpoints, the second service endpoint, and the second service endpoint interface description are provided to the service container via an administrative interface.

17. The system according to claim 16, wherein the service container is adapted to receive the set of correlations via the administrative interface.

* * * * *